Patented May 21, 1935

2,002,085

UNITED STATES PATENT OFFICE 2,002,085

MANUFACTURE OF ALIPHATIC ANHYDRIDES

Henry Dreyfus, London, England

No Drawing. Application February 8, 1933, Serial No. 655,775. In Great Britain February 22, 1932

13 Claims. (Cl. 260—123)

This invention relates to the manufacture of aliphatic anhydrides by the thermal decomposition of aliphatic acids, and especially to the manufacture of acetic anhydride by the thermal decomposition of acetic acid.

I have found that vanadates and molybdates, and especially vanadates and molybdates of metals of groups 1 and 2 of the periodic table, are highly useful catalysts for this reaction. The vanadates or molybdates are preferably simple salts, but double or complex salts, or mixtures of such salts, or mixtures or compounds containing both vanadates and molybdates, may be used.

As examples of compounds that may usefully be employed as catalysts in the process of the present invention may be mentioned metavanadates and pyrovanadates of barium, strontium, calcium, copper, magnesium; simple or polyvanadates of manganese, potassium, lithium, sodium; molybdates and polymolybdates of barium, strontium, calcium, magnesium, manganese, zinc, and the alkali metals, while complex vanadates and molybdates, such as potassium zinc vanadate, barium aluminium molybdate and calcium tungsten molybdate may also be used.

The compounds of the invention may be employed as sole catalysts, as mixtures with each other and/or in conjunction or association with other catalysts capable of promoting the thermal decomposition of aliphatic acids into their anhydrides. It is advisable to employ the molybdates and vanadates in the anhydrous state.

The thermal decomposition of the aliphatic acids may be performed in any convenient way. For instance, the aliphatic acid vapor may be passed in a stream through heated liquid or molten baths comprising one or more of the compounds of the invention. The molten baths may, if desired or necessary, contain salts or other substances of low or relatively low melting point to dissolve or hold in suspension the compounds of the invention, for instance in cases where the compounds themselves are not molten at the temperatures employed. As examples of such substances may be mentioned low melting mixtures of sodium chloride and potassium chloride or magnesium chloride, calcium chloride and magnesium chloride or barium chloride, or metals or metalloids such as lead, tellurium, etc.

Another method of carrying out the invention is to pass the aliphatic acid vapors in a stream over catalyst masses comprising vanadates and/or molybdates contained in tubes or other convenient apparatus and heated to the desired temperature. In such a process, the compounds may be employed deposited upon or mixed with or otherwise in association with carriers or filling materials, and, as mentioned above, they may also be employed in conjunction with or in admixture with other catalysts capable of promoting the thermal decomposition of aliphatic acids into their anhydrides.

If desired the aliphatic acids may be introduced into the reaction zone in the liquid form. For example, the acid containing the catalyst in suspension may be injected or sprayed into a heated reaction zone, if desired after being preheated under pressure sufficient to maintain the acid in the liquid state. Comparatively small amounts of catalyst may be employed; thus, the acid may contain from about ¼% to 2% of one or more of the catlysts, although other proportions may, of course, be used.

Any suitable temperature may be employed for the decomposition, temperatures between about 300° and 900° C., and especially between 600° and 800° C., being very useful. The acids, whether employed in liquid or vapor form, may with advantage be preheated before they are subjected to decomposition; for instance, they may be preheated to a temperature approaching that at which the decomposition is to be effected, although in some cases, especially where the acid is employed in the liquid form as described above, preheating to lower temperatures only may be desirable.

Although any convenient method of separating the anhydride from the reaction gases or vapors may be employed, I prefer to effect such separation under conditions such that the water remains in the vapor phase, as by this means the risk of a rehydration of the anhydride is very much reduced. For example, the reaction vapors may be fractionated in one or more columns. Such fractionation may, if desired, be aided by the use of a liquid having the property of forming with water an azeotropic mixture of minimum boiling point such as benzene, carbon tetrachloride, toluene or the xylenes. Such entraining agents may conveniently be added in the form of liquid or vapor to the reaction gases or vapors after the latter leave the reaction zone.

Other useful methods which may be used for separating the anhydride from the other reaction gases or vapors depend on the use of a substance which is a solvent for the anhydride but not for water. For example, anhydride solvents of boiling point higher than that of water may usefully be employed, and the anhydride condensed in such solvents while the water remains in vapor form. Chlorbenzene, p-dichlorbenzene, benzyl ether, tetrochlorethane, triacetin, phenetol, anisol, the cresols, and p-cresyl acetate are examples of substances which give excellent results when employed in this process. If desired, however, the separation may be carried out at temperatures below the boiling point of water, in which case it is not necessary to use high boiling solvents, and liquids of boiling point below that of water, such as benzene, chloroform, and paraffin hydrocarbons, especially a petroleum fraction of boiling point between about 40° and 70° C., may be employed with advantage. The reaction vapors may be caused to impinge on a cold stream of an anhydride solvent, such as benzene, and thus condensed, the anhydride going into solution in the benzene, while the water may be removed as a separate layer.

Water binding substances, such as bisulphates and pyrosulphates of the alkali and earth alkali metals, zinc chloride, calcium chloride and the phosphoric acids, may also be employed to separate the water vapor from the anhydride; for instance, the reaction gases or vapors may be passed in contact with such substances at a temperature above the boiling point of anhydride under the prevailing conditions, although lower temperatures may, of course, be used.

A fuller description of these several separation processes with examples illustrating their use is to be found in U. S. Patents Nos. 1,915,573 and 1,931,687 and British Patents No. 289,972 and 303,772.

The anhydride, after being separated from the water vapor, may if desired be further purified in any convenient way. For example, acetic anhydride may be distilled from sodium acetate or other metallic acetate.

The invention may be applied to the manufacture of anhydrides from fatty acids, whether the latter are in the anhydrous form or not. Thus, it may be applied to the manufacture of acetic anhydride from an aqueous acetic acid. Moreover, the process may be used in the manufacture of other fatty acid anhydrides, for instance, propionic anhydride, and of substituted fatty acid anhydrides such as methoxyacetic anhydride, from the corresponding acids. If desired the anhydride may be combined with a suitable quantity of water to form a concentrated acid, which provides a convenient method of obtaining a more concentrated acid from a more or less dilute acid.

The following example is intended to illustrate but not to limit the invention.

*Example*

Acetic acid of concentration between 98% and 100%, after being vaporized, is preheated to a temperature of about 600° C. The vapors are then passed through a copper lined tube containing pumice or kieselguhr on which has been precipitated a mixture of anhydrous barium molybdate and barium pyrovanadate. The tube is heated to 750° C. On leaving the reaction zone the gases and vapors are separated in any convenient way as described above.

What I claim and desire to secure by Letters Patent is:—

1. Process for the manufacture of the anhydride of a lower fatty acid which comprises subjecting the lower fatty acid to thermal decomposition in presence of a metal oxy-salt selected from the group which consists of molybdates and vanadates.

2. Process for the manufacture of acetic anhydride which comprises subjecting acetic acid to thermal decomposition in presence of a metal oxy-salt selected from the group which consists of molybdates and vanadates.

3. Process for the manufacture of the anhydride of a lower fatty acid which comprises subjecting the lower fatty acid to thermal decomposition in presence of a metal oxy-salt selected from the group which consists of molybdates and vanadates of metals of groups 1 and 2 of the periodic table.

4. Process for the manufacture of acetic anhydride which comprises subjecting acetic acid to thermal decomposition in presence of a metal oxy-salt selected from the group which consists of molybdates and vanadates of metals of groups 1 and 2 of the periodic table.

5. Process for the manufacture of the anhydride of a lower fatty acid which comprises subjecting the lower fatty acid to thermal decomposition at temperatures of 600 to 800° C. in presence of a metal oxy-salt selected from the group which consists of molybdates and vanadates of metals of groups 1 and 2 of the periodic table.

6. Process for the manufacture of acetic anhydride which comprises subjecting acetic acid to thermal decomposition at temperatures of 600 to 800°C. in presence of a metal oxy-salt selected from the group which consists of molybdates and vanadates of metals of groups 1 and 2 of the periodic table.

7. Process for the manufacture of the anhydride of a lower fatty acid which comprises pre-heating the vapor of the lower fatty acid and then subjecting it to thermal decomposition in presence of a metal oxy-salt selected from the group which consists of molybdates and vanadates.

8. Process for the manufacture of the anhydride of a lower fatty acid which comprises pre-heating the vapor of the lower fatty acid and then subjecting it to thermal decomposition in presence of a metal oxy-salt selected from the group which consists of molybdates and vanadates of metals of groups 1 and 2 of the periodic table.

9. Process for the manufacture of acetic anhydride which comprises pre-heating the vapor of acetic acid and then subjecting it to thermal decomposition in presence of a metal oxy-salt selected from the group which consists of molybdates and vanadates of metals of groups 1 and 2 of the periodic table.

10. Process for the manufacture of the anhydride of a lower fatty acid which comprises subjecting the lower fatty acid to thermal decomposition in presence of a metal oxy-salt, selected from the group which consists of molybdates and vanadates, in association with an inert filling material.

11. Process for the manufacture of acetic anhydride which comprises subjecting acetic acid to thermal decomposition in presence of a metal oxy-salt, selected from the group which consists molybdates and vanadates, in association with an inert filling material.

12. Process for the manufacture of the anhydride of a lower fatty acid which comprises pre-heating the vapor of the lower fatty acid and then subjecting it to thermal decomposition at temperatures of 600 to 800° C. by passage through a molten bath composition comprising a metal oxy-salt selected from the group which consists of molybdates and vanadates of metals of groups 1 and 2 of the periodic table.

13. Process for the manufacture of acetic anhydride which comprises pre-heating vapor of acetic acid and then subjecting it to thermal decomposition at temperatures of 600 to 800° C. by passage through a molten bath composition comprising a metal oxy-salt selected from the group which consists of molybdates and vanadates of metals of groups 1 and 2 of the periodic table.

HENRY DREYFUS.